March 16, 1943. R. A. ROTHERMEL 2,314,053
METHOD OF MAKING STORAGE BATTERY SEPARATORS
Filed Feb. 27, 1941
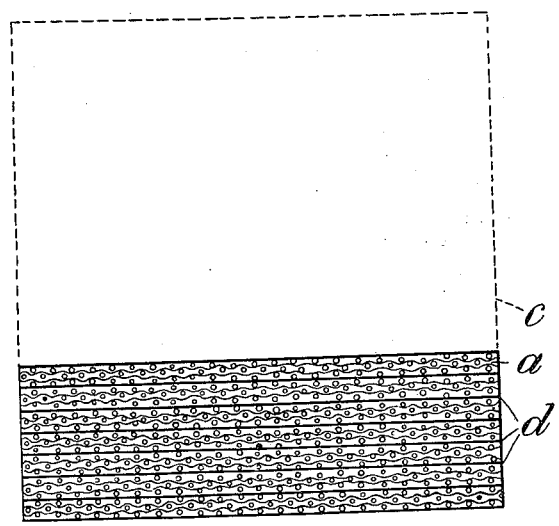
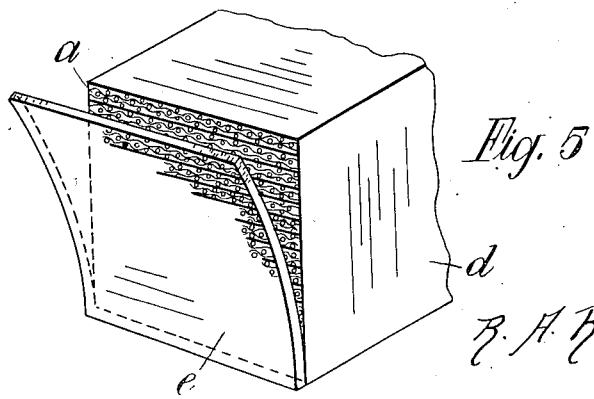
Inventor
R. A. Rothermel
By: Glascock Downing & Seebold Patented Mar. 16, 1943

2,314,053

UNITED STATES PATENT OFFICE 2,314,053

METHOD OF MAKING STORAGE BATTERY SEPARATORS

Royden Albert Rothermel, London, England

Application February 27, 1941, Serial No. 380,946
In Great Britain May 2, 1940

2 Claims. (Cl. 136—148)

This invention relates to an improved method of manufacturing storage battery separators. It is known in the manufacture of storage battery separators to first build up a block of porous material from layers of fibrous material coated with a cementitious substance or from layers of rubber-coated fibrous material, such as cloth in strip form, and then slice or cut the said block into sections so that the porous material extends through the same from one side to the other.

The main object of the present invention is to provide a method of manufacture which will obtain the same result by using a material which is readily accessible—a question of paramount importance at the present time—and which will considerably reduce the cost of the separators.

According to the present invention rubber tires discarded owing to wear are used as the primary material for the formation of the block to be sectioned into separators in the manner hereinafter more particularly referred to.

The discarded rubber tire is first of all cut across, the bead and side walls are then cut off and the pure rubber thread is split off, which leaves a strip of rubberized canvas or rubber-cord fabric, viz., a material composed of layers of rubber and cords. This strip is flattened and cut to the correct width of the separator to be produced. By superimposing a plurality of such strips and interposing between them a rubber solution or the like capable of cementing together the strips a block is built up, which is preferably subjected to heavy pressure to ensure cohesion, vulcanization being employed if considered necessary. The block thus obtained is then sliced or cut into separators, which slicing or cutitng may be effected in any desired manner, it being essential that the slicing be so effected that the cords or fabric of fibrous material will form numerous porous threads extending from one side to the other of the separator.

The separators may be provided with ribs or formed with corrugations, or be otherwise shaped. The ribs may be provided by cementing and, if necessary, vulcanizing strips of rubber thereon; and the corrugations may be obtained by either molding the sliced-off separator in a suitable mold or by cutting the latter direct in the corrugated form from the block by means of a corrugated cutter.

Referring to the accompanying drawing,

Figures 1 to 5 illustrate the successive steps of the process of manufacture.

Figure 1 shows in transverse section part of the discarded tire after it has been cut across and the bead and side walls have been removed; $a$ is the rubberized canvas core comprising a number of canvas layers cemented together by rubber, and $b$ is the pure rubber tread of the tire.

Figure 2 shows the strip of rubberized canvas left after the removal of the rubber tread and Figure 3 shows it after it has been flattened out by pressure.

Figure 4 shows a plurality of rubberized canvas strips, such as shown in Figure 3, superposed to form a block $c$ in which the individual canvas strips $a$ have been cemented together by a rubber or like solution as indicated at $d$, under pressure, with or without vulcanization.

Figure 5 shows the slicing of a separator $e$ from the block $d$.

The details for carrying the invention into effect may be varied, the essential feature being the use of the waste material referred to for the building up of the block in the manner described.

What I claim is:

1. A method of manufacture of storage battery separators comprising the following steps: detaching the rubberized strip of canvas formed of superposed layers from the pure rubber tread of a used tire; cutting the said rubberized strip of canvas formed of superposed layers to the required width of the separator; flattening the cut strip; superimposing a plurality of such strips between which a cementitious material is interposed; cementing the superimposed strips together under the application of heavy pressure in order to obtain a block; and slicing off the separators in a direction which leaves a porous way from one to the other side of the separator through the threads of the canvas.

2. A method of manufacture of storage battery separators as claimed in claim 1 and further comprising the step of vulcanization during the consolidation of the strips into a block under the application of pressure.

ROYDEN ALBERT ROTHERMEL.